United States Patent
Minamiguchi et al.

(10) Patent No.: US 8,605,563 B2
(45) Date of Patent: Dec. 10, 2013

(54) OPTICAL DISC DEVICE AND CONTROL METHOD OF OPTICAL DISC

(75) Inventors: Shuichi Minamiguchi, Tokyo (JP); Hiroharu Sakai, Tokyo (JP); Hajime Nishimura, Tokyo (JP)

(73) Assignee: Hitachi—LG Data Storage, Inc., Tokyo (JP)

( * ) Notice: Subject to any disclaimer, the term of this patent is extended or adjusted under 35 U.S.C. 154(b) by 225 days.

(21) Appl. No.: 12/960,171

(22) Filed: Dec. 3, 2010

(65) Prior Publication Data

US 2011/0161994 A1    Jun. 30, 2011

(30) Foreign Application Priority Data

Dec. 25, 2009  (JP) ................. 2009-294094

(51) Int. Cl.
| | |
|---|---|
| *G11B 7/00* | (2006.01) |
| *G11B 20/18* | (2006.01) |
| *G11B 7/20* | (2006.01) |
| *G11B 3/70* | (2006.01) |
| *G11B 17/00* | (2006.01) |

(52) U.S. Cl.
USPC ............ 369/121; 369/44.41; 369/44.42; 369/53.22; 369/53.27; 369/124.12; 369/124.15; 369/94; 369/283; 369/47.5

(58) Field of Classification Search
USPC ............ 369/121, 44.41, 44.42, 53.22, 53.27, 369/124.12, 124.15, 94, 283, 47.5
See application file for complete search history.

(56) References Cited

U.S. PATENT DOCUMENTS

| | | | |
|---|---|---|---|
| 2008/0089203 A1* | 4/2008 | Nishimura et al. | 369/53.23 |
| 2009/0003185 A1 | 1/2009 | Shou et al. | |
| 2010/0226218 A1* | 9/2010 | Nakamura et al. | 369/47.5 |

FOREIGN PATENT DOCUMENTS

| | | |
|---|---|---|
| JP | 2008-084504 | 4/2008 |
| JP | 2008-234220 | 10/2008 |
| JP | 2009-015893 | 1/2009 |

* cited by examiner

*Primary Examiner* — Aneeta Yodichkas
(74) *Attorney, Agent, or Firm* — McDermott Will & Emery LLP (57) ABSTRACT

An optical disc device comprising: a controller for reading data from an optical disc having a plurality of recording layers, wherein: the controller, in shifting a focus of the laser light from a first layer to a second layer, performs a first change that changes a setting on the high frequency signal to a predetermined value at which the high frequency signal is superimposed to suppress peak power of the drive signal if a light density of the second layer is higher than a light density of the first layer; the controller shifts the focus from the first layer to the second layer; and the controller, after the focus has been shifted, performs a second change that changes the setting on the high frequency signal to a predetermined value at which the high frequency signal is superimposed to increase the peak power of the drive signal.

7 Claims, 8 Drawing Sheets

OPTICAL DISC DEVICE AND CONTROL METHOD OF OPTICAL DISC

CLAIM OF PRIORITY

The present application claims priority from Japanese patent application JP2009-294094 filed on Dec. 25, 2009, the content of which is hereby incorporated by reference into this application.

BACKGROUND OF THE INVENTION

This invention relates to an optical disc device and, in particular, relates to focus control of an optical disc having multiple recording layers.

Recent optical discs have increased their storage capacity as CDs (Compact Discs), DVDs (Digital Versatile Discs), BDs (Blu-ray Discs), and the like come into practical use. The increase in storage capacity of these optical discs has been achieved by increasing recoding density. The recording density is increased by reducing a spot size, which is achieved by shortening the wavelength of laser light. Since BDs, it has been difficult to shorten the wavelength of laser light to increase the storage capacity as materials for recording layers of optical discs and optical systems have limitations. To still increase the capacity, multilayer optical discs have been developed and known in which a plurality of recording layers are stacked or multilayered to increase the storage capacity (for example, refer to JP 2009-015893 A, JP 2008-084504 A, and JP 2008-234220 A).

The above-mentioned JP 2009-015893 A relates to an optical disc device that changes the frequency or amplitude of a high frequency signal which is to be superimposed on laser light after focusing on a destination layer (a target layer) to shift focus from layer to layer. The disclosed technique is to determine the frequency or the amplitude of the high frequency signal for each layer at which crosstalk caused by reflection from other layers (inter-layer crosstalk) will be a minimum.

In the above-mentioned JP 2008-084504 A, the power of laser light is changed for every layer if the numerical aperture (NA) for reading is different depending on the layer, namely, if the spot size of laser light is different depending on the layer. Furthermore, in focusing, the high frequency signal superimposed on the laser light is temporarily cut off to prevent deterioration of existing recorded data on the layers other than the target layer or the recording films thereof by the peak power of the superimposed high frequency signal.

The above-mentioned JP 2008-234220 A discloses a technique that preliminarily records read power for every layer in a predetermined area of an optical disc and retrieves the read power from the area to adjust the power of laser light.

SUMMARY

In the meanwhile, in a multilayer optical disc, taking an example of BD, a three-layer disc requires 1.5 times more power of laser light necessary for playing (read power), and a four-layer disc requires two times more, than a two-layer disc.

Although the read power increases with the number of layers, some of the recording planes provided on the layers may not be able to tolerate the increased read power. This is because, if the increased read power increases the light density in a spot on a recording plane and the light density exceeds the tolerance of the recording plane (the upper limit of the acceptable light density), the recorded data may be corrupted or the recording plane may be deteriorated.

If a multilayer optical disc is played with the same laser power for every layer at a constant numerical aperture and the constant frequency and amplitude of the superimposed high frequency signal, one or more layers may be damaged on their recording planes to be unplayable.

The damage of a recording plane occurs depending on the light density of the irradiated laser light. Denoting the light density as D, the light density D can be calculated by the following formula:

$$D = P/S \quad (1)$$

where P denotes the laser power of read laser light and S denotes the spot diameter of the laser light. Namely, the light density D indicates the power density of laser light.

With respect to the above formula (1), if the spot diameter S is treated as a constant because it is a value that depends on an object lens, the light density D is proportional to the read laser power P. If every layer of a multilayer optical disc is played in the above-described same condition, reflection and dispersion occur on the layers near the incident layer (surface) of the laser light. Accordingly, the more distant from the surface the layer is, the lower the read laser power P is. If the layers of a multilayer optical disc are referred to as a first layer, a second layer . . . to an n-th layer in this order from the surface, the light densities D1 to Dn for the respective layers will be:

$$D_1 > D_2 > \ldots > D_n \quad (2)$$

where the light density D1 of the first layer that is closest to the surface will be the highest.

If each layer is played in the above-described same condition, the different light density D in each layer causes corruption of recorded data on a recording plane. Moreover, the inventors of this invention have found that, if the numerical aperture is constant, the light density D depends on the amplitude and the frequency of the superimposed high frequency signal for reducing noise in the laser light.

In JP 2009-015893 A, however, in shifting focus to a target layer, the frequency or the amplitude of the high frequency signal superimposed on the laser light is changed after having focused on the target layer to be played, so if the target layer is located closer to the surface than the layer before the shift, the light density increases so that the recording plane of the target layer might be damaged to become unplayable.

Such a problem does not occur in JP 2008-084504 A since the numerical aperture is changed for each layer. However, to shift focus to another layer in a multilayer optical disc, superimposition of the high frequency signal on the laser light is temporarily stopped and is resumed after getting in focus. Accordingly, it takes time to switch on and off the high frequency signal during a focusing operation, resulting in an overhead during the focusing operation.

In JP 2008-234220 A, laser power is changed for every layer, but if the high frequency signal is constant, the recording plane might be damaged as described above.

This invention has been made in view of the above-described problems and an object of the invention is to consistently suppress noise in laser light while preventing the recording planes from being damaged in playing the layers of a multilayer optical disc with an object lens at the same numerical aperture.

To solve the problems, an optical disc device comprising: a laser light source driven by a drive signal with a high frequency signal superimposed; a detector for detecting reflection of laser light emitted from the laser light source; and a controller for reading data from an optical disc having a plurality of recording layers with a signal outputted from the detector, wherein: the controller, in shifting a focus of the laser light from a first recording layer to a second layer among the plurality of recording layers, performs a first change that changes a setting on the high frequency signal to a predetermined value at which the high frequency signal is superimposed to suppress peak power of the drive signal if a light density of the second recording layer is higher than a light density of the first recording layer; the controller shifts the focus from the first recording layer to the second recording layer; and the controller, after the focus has been shifted, performs a second change that changes the setting on the high frequency signal to a predetermined value at which the high frequency signal is superimposed to increase the peak power of the drive signal if the light density of the second layer is lower than the light density of the first recording layer.

According to this invention, noise in laser light can be suppressed with a high frequency signal superimposed on the laser light but with no damage to the recording planes of a multilayer optical disc.

DETAILED DESCRIPTION OF THE EMBODIMENTS

Hereinafter, a preferred embodiment of this invention will be described with reference to the accompanying drawings.

Figure 1:
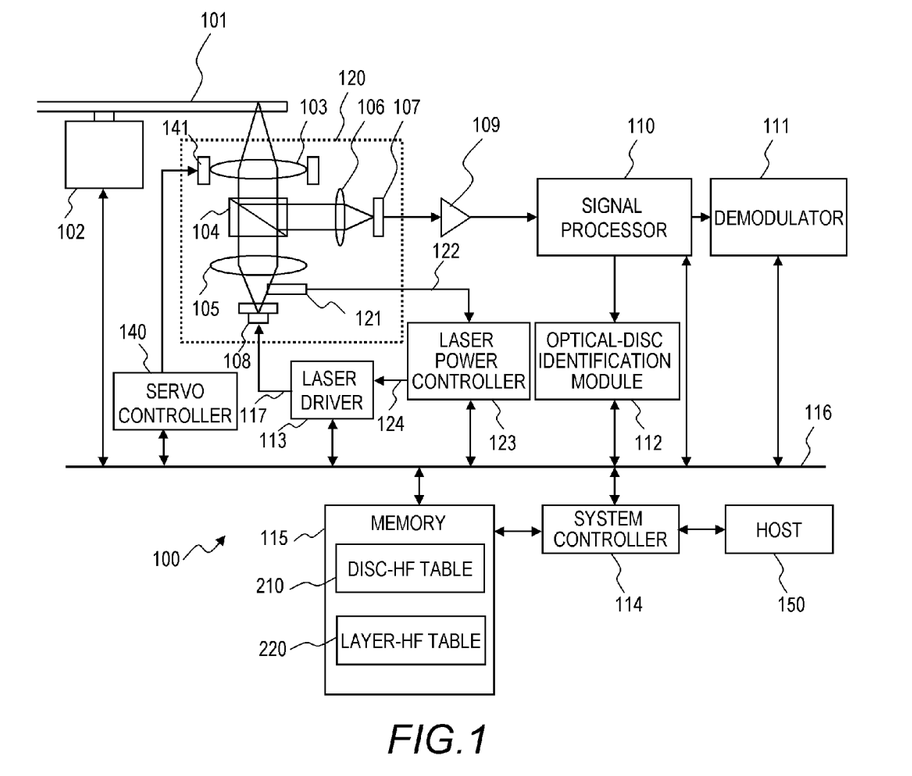
FIG. 1 is a block diagram illustrating a configuration of an optical disc device in the embodiment of the invention.

FIG. 1 is a block diagram illustrating a configuration of an optical disc device 100 in this embodiment of the invention.

The optical disc device 100 in this embodiment is coupled to a host computer 150 and outputs data read from an optical disc 101 (for example, a Blu-ray Disc or BD) loaded therein to the host computer 150. The optical disc device 100 may have a function of recording data received from the host computer 150 onto a writable optical disc 101.

The optical disc device in this embodiment comprises a spindle motor 102, a current-to-voltage (I/V) converter 109, a signal processor 110, a demodulator 111, an optical-disc identification module 112, a laser driver 113, a system controller 114, a memory 115, a data bus 116, an optical pickup 120, a laser power controller 123, and a servo controller 140.

The spindle motor 102 rotates and drives an optical disc 101 loaded in the optical disc device 100.

The optical pickup 120 comprises an object lens 103, a beam splitter 104, a collimating lens 105, a focal lens 106, a photoelectric converter 107, a laser light source 108, and a monitor diode 121. When playing data in an optical disc 101, the optical pickup 120 irradiates the optical disc 101 with weak laser light, reads data recorded on the optical disc 101 using the reflection of the laser light, and outputs an RF (radio frequency) signal corresponding to the reflection.

The laser light source 108 is a semiconductor laser that generates a desired intensity of laser light for reading and writing, and emits laser light having a wavelength specified for each type of disc to be loaded. The laser light emitted by the laser light source 108 impinges on a specific radial position of the recording plane of the optical disc 101 through the collimating lens 105 and the object lens 103. The object lens 103 is driven by an actuator 141 to adjust the laser light to be focused on the disc plane.

In writing data onto the optical disc 101, the laser light source 108 irradiates the optical disc 101 with more intensive laser light than in reading data therefrom. By thermal phase-change at the spot which the laser light has irradiated on the optical disc 101, a recording pit is formed on the recording plane. The recording pit changes the reflectance of the recording plane to record data.

The laser light reflected on the recording plane of the optical disc 101 is split by the beam splitter 104, collected by the focal lens 106, and introduced to the photoelectric converter 107. The photoelectric converter 107 converts the received reflected light into an electric signal (an RF signal) and outputs the RF signal corresponding to the reflection.

The monitor diode 121 is for detecting laser power for APC (Auto Power Control). The signal bandwidth for the monitor diode 121 may be sufficiently low compared with the high frequency signal which is superimposed on the read laser light. The monitor diode's output signal 122 detected by the monitor diode 121 is sent to the laser power controller 123.

The I/V converter 109 converts a current signal outputted from the photoelectric converter 107 into a voltage signal (an RF signal) and amplifies it. The signal processor 110 is a digital signal processor (DSP), which converts the RF signal outputted from the I/V converter 109 into digital data. The signal processor 110 outputs an optical-disc identifier signal differing depending on the structure of the optical disc, a focus error signal for adjusting the focal point of laser light, and a tracking error signal for following a track of the optical disc 101.

The demodulator 111 demodulates the digital data outputted from the signal processor 110 in accordance with the format specified for each type of optical disc, performs error detection and error correction on it, and then temporarily stores the demodulated data in the memory 115 (buffer).

The optical-disc identification module 112 identifies the type of the loaded optical disc 101 with reference to the optical-disc identifier signal outputted from the signal processor 110. It should be noted that the optical-disc identification module 112 may be a program to be executed by the system controller 114.

The identification result on the optical disc 101 outputted from the optical-disc identification module 112 is sent to the system controller 114 via the data bus 116. The system controller 114 controls modules to be in optimum conditions (read conditions and write conditions) for the identified optical disc with reference to the identification result of the optical disc.

The laser driver 113 outputs a laser drive signal 117 for driving the laser light source 108 in the optical pickup 120. The laser power controller 123 sets a laser power target value for reading or writing in accordance with the type of the optical disc identified by the optical-disc identification module 112.

The system controller 114 comprises a microprocessor for controlling operations of the optical disc device 100 and a memory. The memory 115 stores a program to be executed and data necessary for executing the program. The system controller 114 comprises a processor, and further, an interface for controlling sending and receiving of data and commands between the optical disc device 100 and the host computer 150 coupled thereto. The system controller 114 controls reading of data temporarily stored in the memory 115 and writing of data to the memory 115. The system controller 114 interprets a command received from the host computer 150 and processes the received command.

The memory 115 includes a buffer area where data read from the optical disc 101 is temporarily stored. The memory 115 stores a disc-HF table 210 in which the frequency and the amplitude of the high frequency signal to be superimposed on the laser light and a laser power target value are preset for each kind of optical disc 101. If the optical disc 101 is a multilayer optical disc, the memory 115 further stores layer-HF tables 220 in each of which the frequency and the amplitude of the high frequency signal to be superimposed on the laser light and a laser power target value are preset for each layer.

The data bus 116 connects modules in the optical disc device 100.

Figure 2:
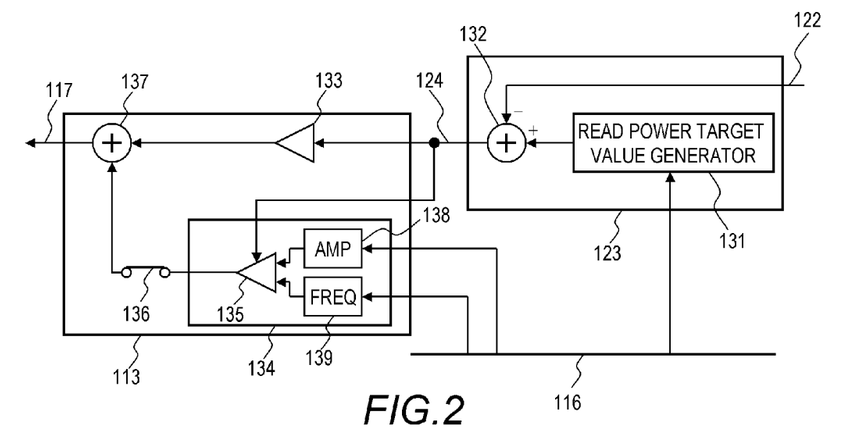
FIG. 2 is a block diagram illustrating a configuration of the laser driver and the laser power controller.

FIG. 2 is a block diagram illustrating a configuration of the laser driver 113 and the laser power controller 123.

The laser power controller 123 comprises a read power target value generator 131 and a subtractor 132.

First, in accordance with the type of the optical disc 101 identified by the optical-disc identification module 112, the system controller 114 sets a target value of the average laser power for playing the optical disc on the read power target value generator 131. If the optical disc 101 is a multilayer optical disc having a plurality of recording layers, it sets a laser power target value for each layer on the read power target value generator 131, which will be described later. In this connection, the laser power for each layer may be the same.

The subtractor 132 calculates the difference value 124 between the target value set on the read power target value generator 131 and the value of the monitor diode's output 122. The calculated difference value 124 is sent to the laser driver 113.

The laser driver 113 comprises an amplifier 133, a high-frequency signal generator 134, a switch 136, and an adder 137.

The laser driver 113 controls the intensity of the laser light outputted from the laser light source 108 with the difference value 124 calculated by the laser power controller 123. This control compensates for a temperature change around the laser light source 108 and a change in the I/L (drive current to light emission property) ratio caused by degradation over time to set an appropriate laser power.

The amplifier 133 amplifies a received difference value 124 and sends the amplified value to the adder 137.

The high frequency signal generator 134 comprises a variable gain amplifier 135, an amplitude controller 138, and a frequency controller 139, and generates a high frequency signal to be superimposed onto the laser drive signal 117.

The amplitude and the frequency of the high-frequency signal to be outputted from the high-frequency signal generator 134, or the amplitude and the frequency of the high frequency signal to be superimposed onto the read laser power, can be determined by the system controller 114. Specifically, the amplitude controller 138 controls the amplitude of the high-frequency signal to be superimposed with the value determined by the optical-disc identification module 112 or the system controller 114. The frequency controller 139 controls the frequency of the high frequency signal to be superimposed with the value determined by the optical-disc identification module 112 or the system controller 114.

The variable gain amplifier 135 amplifies an amplitude signal outputted from the amplitude controller 138 and a high frequency signal outputted by the frequency controller 139 with the gain controlled by the difference value 124 to generate a high-frequency signal having a desired amplitude.

The switch 136 controls on and off of the output of the high frequency signal generator 134. When the switch 136 is off, the high frequency signal generator 134 does not output a high frequency signal, so a high frequency signal is not superimposed on the laser output.

The adder 137 adds the output of the amplifier 133 and the output of the high-frequency signal generator 134. The output of the adder 137 is outputted as a laser drive current 117 from the laser driver 113.

The high frequency signal generator 134 periodically makes laser light emitted to reduce laser interference and mode hop noise.

Figure 3:
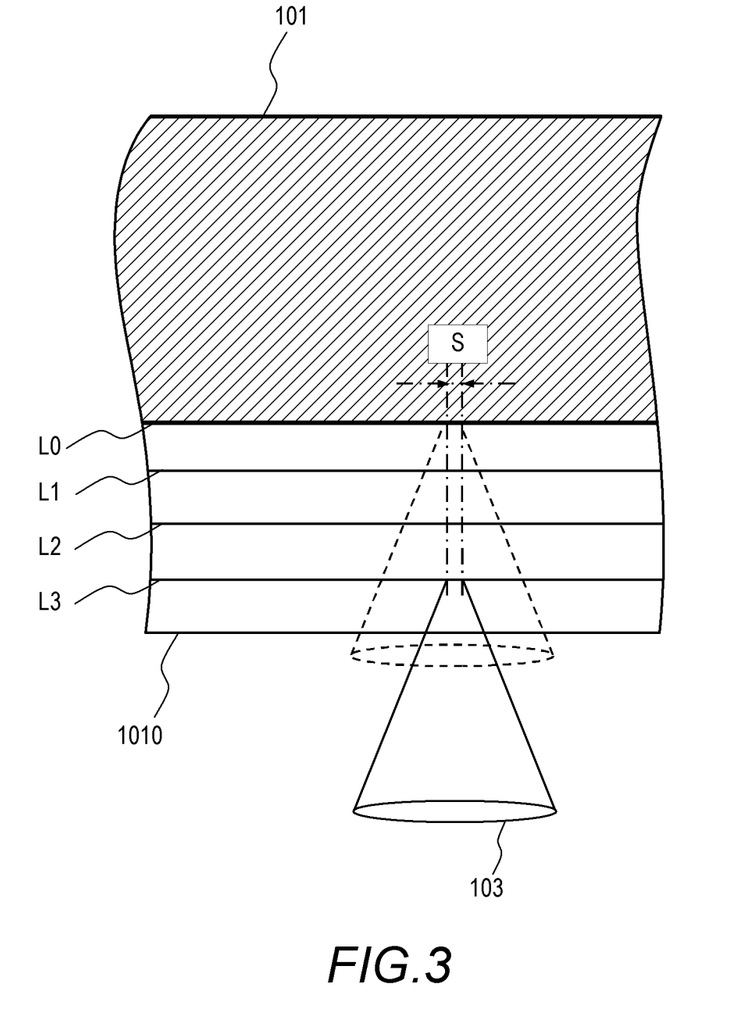
FIG. 3 is a sectional view of an example of a multilayer optical disc to which this invention is applied.

FIG. 3 is a sectional view of an example of a multilayer optical disc 101 to which this invention is applied. The multilayer optical disc 101 has a plurality of layers L0 to L3 each having a recording plane provided at a specified distance (or depth) from a surface 1010, which is the plane to face the object lens 103 of the optical disc device. The illustrated example of a multilayer optical disc 101 has a four-layer structure. Between the layer L3 closest to the surface 1010 and the layer L0 most distant from the surface 1010, layers L2 and L1 are provided; the layers L3, L2, L1, and L0 are stacked in this order from the surface 1010.

In this embodiment, the numerical aperture of the object lens 103 is constant. When each of the layers L0 to L3 is in focus, laser light irradiates a spot having a diameter S as illustrated.

Figure 4:
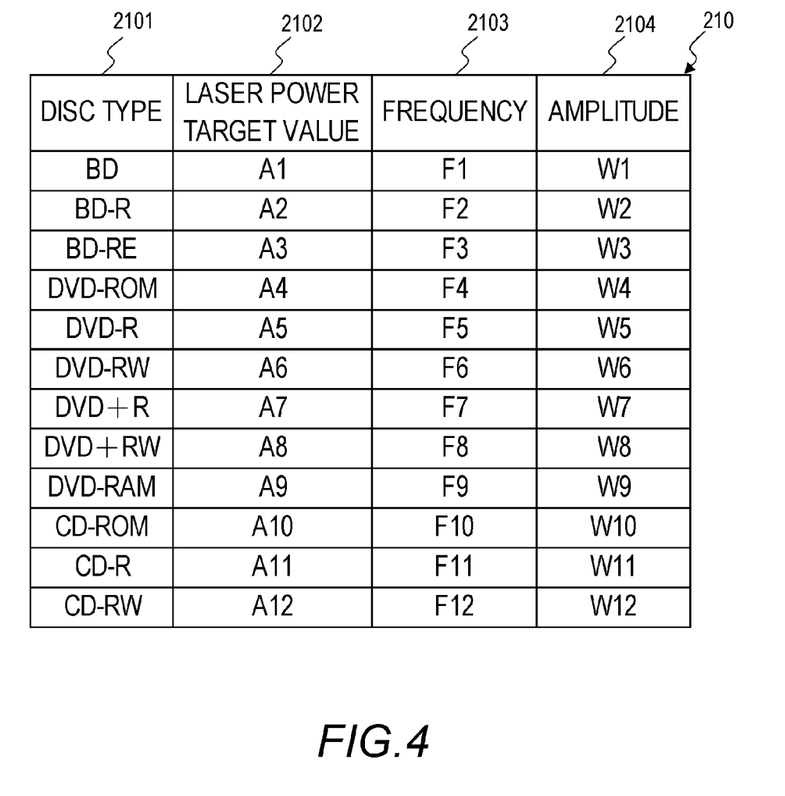
FIG. 4 is an explanatory drawing exemplifying a disc-HF table in which frequency and amplitude of the high frequency signal to be superimposed on the laser light and a laser power target value are preset for each type of the optical disc.

FIG. 4 is an explanatory drawing exemplifying a disc-HF table 210 in which frequency and amplitude of the high frequency signal to be superimposed on the laser light and a laser power target value are preset for each type of the optical disc 101.

In the disc-HF table 210, an entry consists of a disc type 2101 for storing the type of the optical disc 101, a target value 2102 for storing a target value of average read laser power to be set on the read power target value generator 131, and a frequency 2103 and an amplitude 2404 of the high frequency signal to be superimposed on the laser light to be set on the high frequency signal generator 134. These target value 2102, the frequency 2103, the amplitude 2104 are predetermined for each type of optical disc 101.

Figure 5:
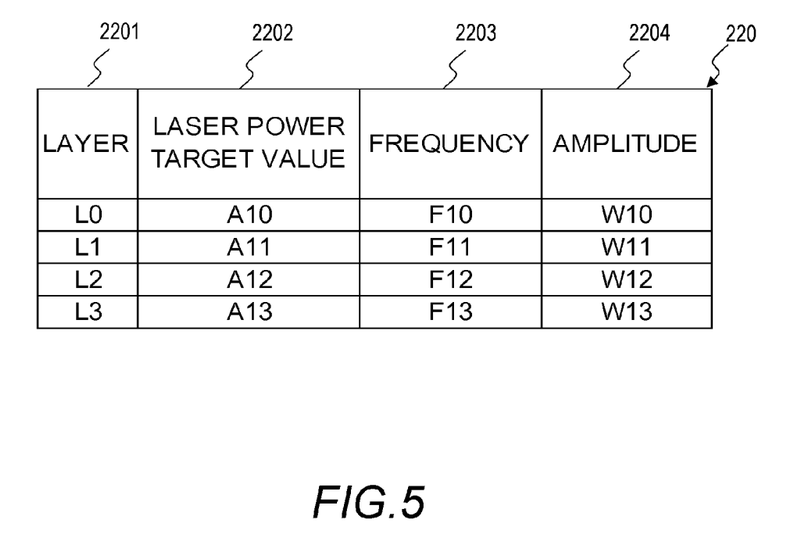
FIG. 5 is an explanatory drawing exemplifying a layer-HF table in which the frequency and amplitude of the high frequency signal to be superimposed on the laser light and a laser power target value are preset for each layer of a multilayer optical disc.

FIG. 5 is an explanatory drawing exemplifying a layer-HF table 220 in which the frequency and amplitude of the high frequency signal to be superimposed on the laser light and a laser power target value are preset for each layer of a multilayer optical disc 101.

In the layer-HF table 220, an entry consists of a layer 2201 for storing the location of the layer of the multilayer optical disc 101, a target value 2202 for storing a target value of average read laser power to be set on the read power target value generator 131, a frequency 2203 of the high frequency signal to be superimposed on the laser light, and an amplitude 2204 of the high frequency signal to be superimposed on the laser light. These target value 2202, the frequency 2203, the amplitude 2204 are predetermined for each layer of a multilayer optical disc 101. The layer-HF table 220 is preset on each piece of identification information (manufacturer, model, and the like) in a multilayer optical disc 101. As a parameter for the superimposed high frequency signal, for example, superimposition level may be set in the table in addition to the above-described parameters.

As described with respect to the expression (2) in the background of the invention, the light density D is higher as the layer is closer to the surface 1010 of the optical disc 101. Accordingly, the peak power with the high frequency signal superimposed should be more suppressed as the layer is closer to the surface 1010. Hence, the amplitudes W10 to W13 for the layers L0 to L3, respectively, are set so that the amplitude will be smaller as the layer is closer to the surface 1010, as expressed as follows:

$$W10 > W11 > W12 > W13.$$

The frequencies F10 to F13 for the layers L0 to L3, respectively, may be changed as long as the change of the frequency yields an equivalent effect to that obtained by changing the amplitude of the superimposed high frequency signal.

Figure 9:
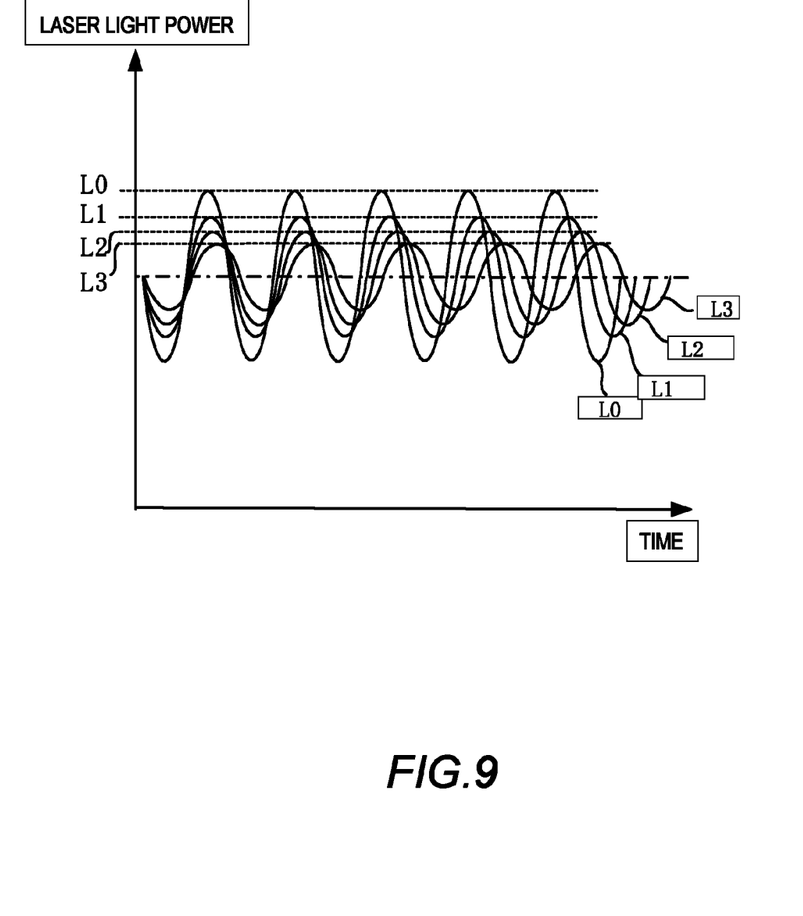
FIG. 9 is a graph showing the relationship between the laser power with a high frequency signal superimposed and the time in each layer.

With reference to FIG. 9 showing an example of the above-described setting, a high frequency signal having a smaller amplitude is superimposed on laser light in a layer with higher light density D (closer to L3) to suppress the peak power. In contrast, in a layer with lower light density D (closer to L0), the peak power is increased to enhance the suppression of laser noise to set off the low light density D. FIG. 9 is a graph showing the relationship between the laser power with a high frequency signal superimposed and the time in each layer.

It is preferable to set the read laser power target value 2202 at a smaller value for a layer closer to the surface 1010. For example, it may be set in the relationship of A10>A11>A12>A13.

Figure 6:
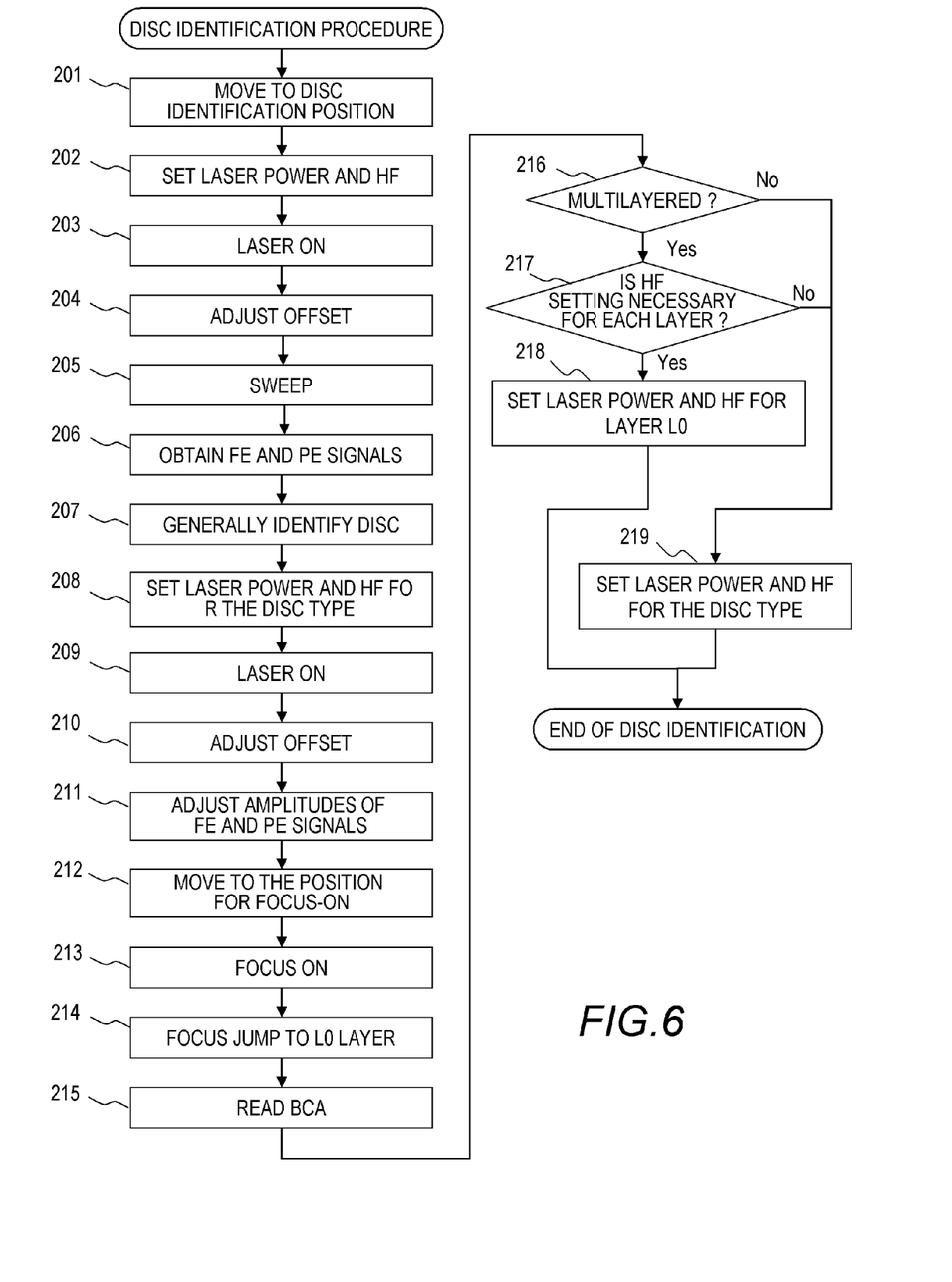
FIG. 6 is a flowchart of a disc identification procedure for the optical disc device in the embodiment, and the procedure is executed by the optical-disc identification module.

FIG. 6 is a flowchart of a disc identification procedure for the optical disc device 100 in this embodiment, and the procedure is executed by the optical-disc identification module 112.

To identify an optical disc 101 loaded in the optical disc device 100, the optical-disc identification module 112 first moves the optical pickup 120 to a predetermined position for disc identification (for example, the innermost circumference) (201), sets the amount of light and the frequency and amplitude of a high frequency signal to be superimposed on laser light at predetermined initial values (202), and turns on the laser light source 108 to emit laser light of predetermined initial wavelength, amount of light, frequency, and amplitude with the high frequency signal superimposed (203). The peak power of the high frequency signal is preferably set at a minimum until the optical disc 101 is generally identified.

Next, the optical-disc identification module 112 adjusts an offset voltage to be applied to the photoelectric converter 107 with reference to the amount of the reflection received by the photoelectric converter 107 (204).

Then, it instructs the servo controller 140 to move the object lens 103 toward the optical disc 101 with the actuator 141, starts a focus sweep (205), and obtains a focus error signal (FE) and an intensity signal (PE) (206).

The optical-disc identification module 112 compares the position in thickness where the focus error signal and the intensity signal have been obtained with the specifications of discs to locate the recording layer of the loaded disc, and identifies the system of the loaded disc 101 as either CD, DVD, or BD to end the general identification of the disc (207).

After the general identification of the disc, the optical-disc identification module 112 sets the wavelength, the amount of light, the frequency and amplitude of the high frequency signal to be superimposed on laser light at the initial values for the identified system of the optical disc 101 (208), and turns on the laser light source 108 in the wavelength for the system of the optical disc 101 to emit laser light at the laser power, the frequency, and the amplitude predetermined in accordance with the system of optical disc (209).

For the initial values for the system of the optical disc 101 identified by the optical-disc identification module 112, preset information related to the disc type 2101 can be obtained from the disc-HF table 210. For example, if the system of the optical disc 101 is generally identified as BD, the values for BD-RE are obtained as the initial values for the system BD. As the initial values for each system, the values at which the laser power will be the lowest and the amplitude will be the smallest are preferably used. Namely, as the initial values for the high frequency signal, the set of values at which the peak power will be the lowest is preferably used. For example, if the system of the optical disc 101 is generally identified as BD, the type of optical disc 101 may be BD-ROM, BD-R, or BD-RE. Among these types, if the values for the type at which the playing tolerance to the recording plane (the tolerable highest light density) will be the lowest are set on the high frequency signal as the initial values for the BD system, the recording plane of the optical disc 101 can be prevented from being damaged in the identification procedure.

If the optical pickup 120 is equipped with a spherical aberration compensation mechanism like a spherical aberration lens, the initial setting on the spherical aberration compensation mechanism may be selected in accordance with the generally identified system of the optical disc 101.

The optical-disc identification module 112 adjusts the offset voltage to be applied to the photoelectric converter 107 with reference to the reflection received by the photoelectric converter 107 (210). Then, it moves the object lens 103 with the actuator 141, obtains a focus error signal (FE) and an intensity signal (PE), and adjusts the amplitudes of the obtained focus error signal (FE) and the intensity signal (PE) so that the identification threshold will be consistent, by adjusting the gain with which the signal processor 110 processes the obtained signals (211).

Next, the optical-disc identification module 112 moves the optical pickup 120 to a position for focusing (212) and focuses it on an arbitrary layer (213). Then, it carries out a focus jump onto the layer (for example, the layer L0) for disc identification (214). The destination layer of the focus jump is usually the layer L0 on which management information (for example, a BCA, Burst Cutting Area, in a BD) is recorded.

Then, the optical-disc identification module 112 retrieves the management information (BCA) recorded on the destination layer (the layer L0) (215) to obtain the type of the optical disc 101 therefrom. The type of the optical disc 101 here is a detail of the system of disc, which has been generally identified in the above step 207. For example, if the system is BD, the optical-disc identification module 112 obtains the information about the type, either ROM, R, or RE, from the management information.

If the retrieved management information contains information about the optical disc 101 of the detailed type and whether the disc is a multilayer disc or not, the optical-disc identification module 112 determines whether the optical disc 101 is multilayered or not (216). The detailed type of optical disc 101 means a detailed type, such as ROM, ReWritable, Recordable, or RAM, in the system (BD, DVD, or CD) generally identified in the above step 207. If the retrieved management information does not contain the information on whether the disc is a multilayer disc or not, the optical-disc identification module 112 executes the above steps 205 and 206 to locate the layer or layers in the thickness of the optical disc 101, and if there are a plurality of layers, it determines that the optical disc 101 is a multilayer optical disc.

If the optical disc 101 is multilayered, the optical-disc identification module 112 determines whether or not every layer needs setting on the high frequency signal (217). In this determination, the optical-disc identification module 112 obtains the identification information of the optical disc 101 from the management information, and if a layer-HF table 220 corresponding to the identification information exists, it determines that every layer needs setting on the high frequency signal and proceeds to step 218.

In the step 218, the optical-disc identification module 112 reads the layer-HF table 220 to retrieve the target value 2202, the frequency 2203, and the amplitude 2204 for the layer L0 which is currently in focus, and sets the retrieved values on the read power target value generator 131 and the high frequency signal generator 134.

On the other hand, if the layer-HF table 220 corresponding to the identification information does not exist and the optical disc 101 is not multilayered, the optical-disc identification module 112 proceeds to step 219, refers to the disk-HF table 210 in accordance with the detailed type of the optical disc 101 retrieved from the management information, retrieves the target value 2102, the frequency 2103, and the amplitude 2104 from the disk-HF table 210, and sets them on the read power target value generator 131 and the high frequency signal generator 134. Through these steps, the optical-disc identification module 112 can set the optimum high frequency signal for the optical disc 101 whose type has been identified.

Through the above-described procedure of the identification of optical disc 101, the type of disc can be identified with no damage to recording planes at low peak power but with laser noise suppressed while superimposing a high frequency signal on laser light. In particular, when laser light is emitted (202), the optical-disc identification module 112 sets the amplitude of the high frequency signal to be superimposed on the laser light to provide a minimum peak power; after the optical disc 101 is generally identified, it sets a high frequency signal that will not damage the recording planes of the identified system of disc (208); if the disc 101 is a multilayer optical disc, it sets a high frequency signal depending on the layer (218). Through these steps, the type of the optical disc 101 can be identified smoothly with no damage to the recording planes of the plurality of layers owing to superimposition of a high frequency signal on laser light, while suppressing laser noise.

The above-described procedure may be executed by the system controller 114 instead of the optical-disc identification module 112.

Figure 7:
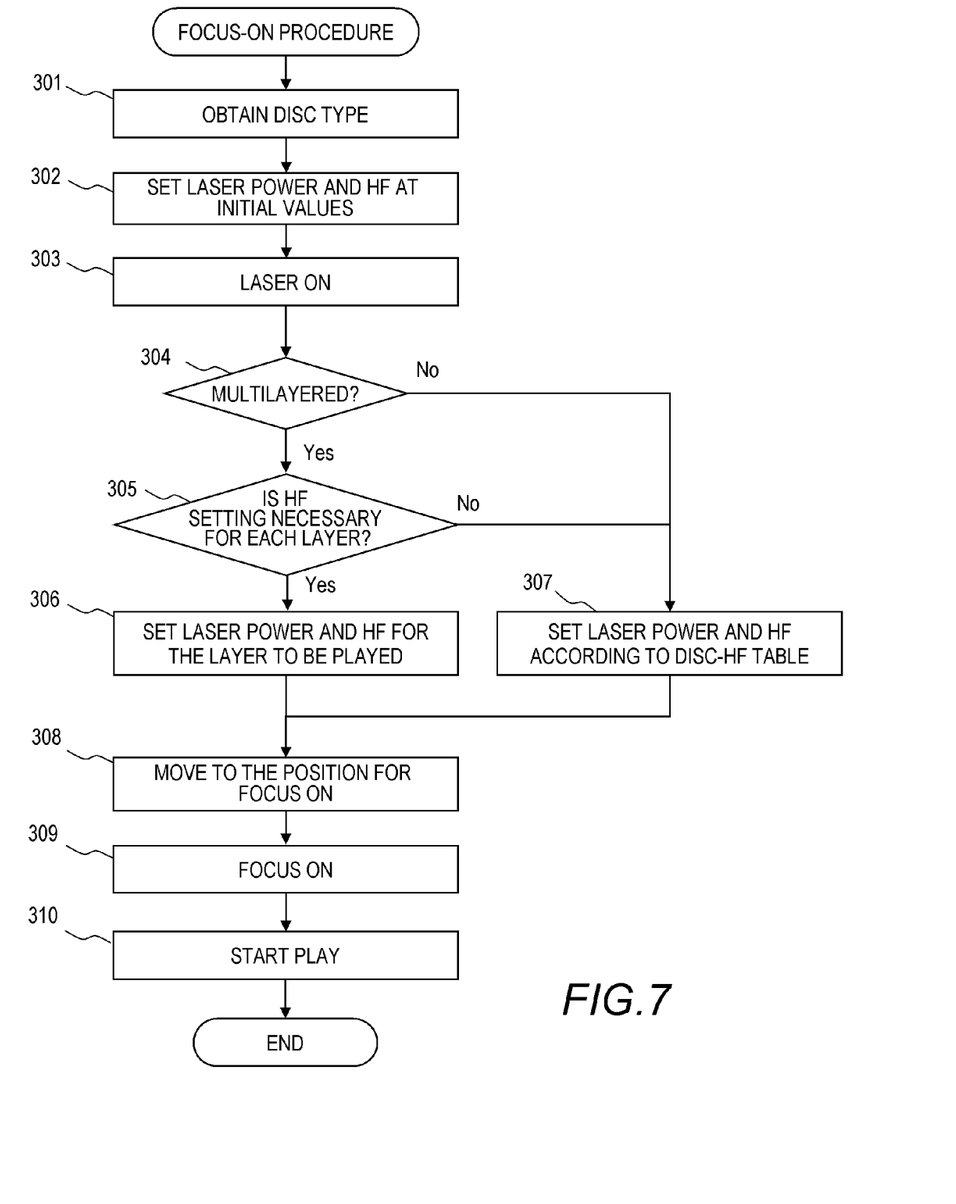
FIG. 7 is a flowchart of a focus-on procedure for playing in the optical disc device in the embodiment and the procedure is executed by the system controller.

FIG. 7 is a flowchart of a focus-on procedure for playing in the optical disc device 100 in this embodiment and the procedure is executed by the system controller 114.

First, the system controller 114 retrieves the type of the optical disc 101 obtained in the disc identification procedure described above with reference to FIG. 6.

Next, the system controller 114 sets the laser power and the frequency and the amplitude of the high frequency signal at initial values for the type of the optical disc 101 with reference to the disc-HF table 210 (302), starts up the laser light source 108, and starts irradiation of laser light (303). As the initial values of the laser power and the high frequency signal during the focus-on operation, the set of lowest values of the laser power and the high frequency signal for the type and the layer of the optical disc 101 are used. For example, if the type of the optical disc 101 is the BD, the set of values for the layer L3, on which the light density D is the highest, is used among the sets of values in the layer-HF table 220. Furthermore, if a plurality of layer-HF tables 220 exist in identification information of the optical disc 101, the set of lowest values in the sets of values for the 4 layers is used as the initial values.

Namely, the system controller 114 sets the lowest laser power and the smallest amplitude in the values for the system of BD. This setting prevents the recording planes of the optical disc 101 from being damaged by the peak power with a high frequency signal superimposed.

Next, the system controller 114 determines whether the optical disc 101 is multilayered or not with reference to the management information retrieved in the above-described steps 212 to 215 of FIG. 6 (304).

If the optical disc 101 is identified as a multilayer optical disc from the retrieved management information, the system controller 114 proceeds to step 305. On the other hand, if the optical disc 101 is a mono-layer disc, the setting of the laser power of laser light and the high frequency signal proceeds to step 307, uses the values for the type of the optical disc 101 preset in the disc-HF table 210, and proceeds to step 308.

In the step 305, the system controller 114 obtains identification information of the optical disc 101 from the retrieved management information and determines whether or not there exists a layer-HF table 220 corresponding to the identification information. If the layer-HF table 220 corresponding to the identification information exists, the system controller 114 determines that the high frequency signal needs to be set for every layer, and proceeds to step 306.

In the step 306, the system controller 114 reads the layer-HF table 220 to retrieve the target value 2202, the frequency 2203, and the amplitude 2204 for the intended layer L0 which is currently being focused on, and sets them on the read power target value generator 131 and the high frequency signal generator 134. Through this operation, the system controller 114 can set the optimum high frequency signal for the layer of the optical disc 101.

Next, the system controller 114 moves the optical pickup 120 to a predetermined position for focusing (308) and focuses it onto the intended layer (for example, the layer L0) (309). Then, the system controller 114 adjusts tracking and starts playing the optical disc 101 (310).

Through the above-described procedure, the system controller 114 can achieve a focus-on operation in playing the optical disc 101 with no damage to the recording planes at a minimum peak power and a minimum laser power for the type of the optical disc 101 while suppressing laser noise by superimposing a high frequency signal on laser light. In particular, since the initial values of the minimum peak power and laser power for the type of the optical disc 101 which has been identified by the system controller 114 are used at emission of laser light (303), management information can be read with no damage to the recording planes of the layers by the superimposed high frequency signal at irradiation of the laser light. Then, the optimum peak power and laser power for the type of the optical disc 101 is used after the identification of the multilayer optical disc is performed on the basis of the management information. Through these steps, a smooth focus-on operation to the optical disc 101 can be achieved with laser noise suppressed.

The above-described procedure shown in FIG. 7 may be applied to resumption from a focusing servo off state or a sleep state.

Figure 8:
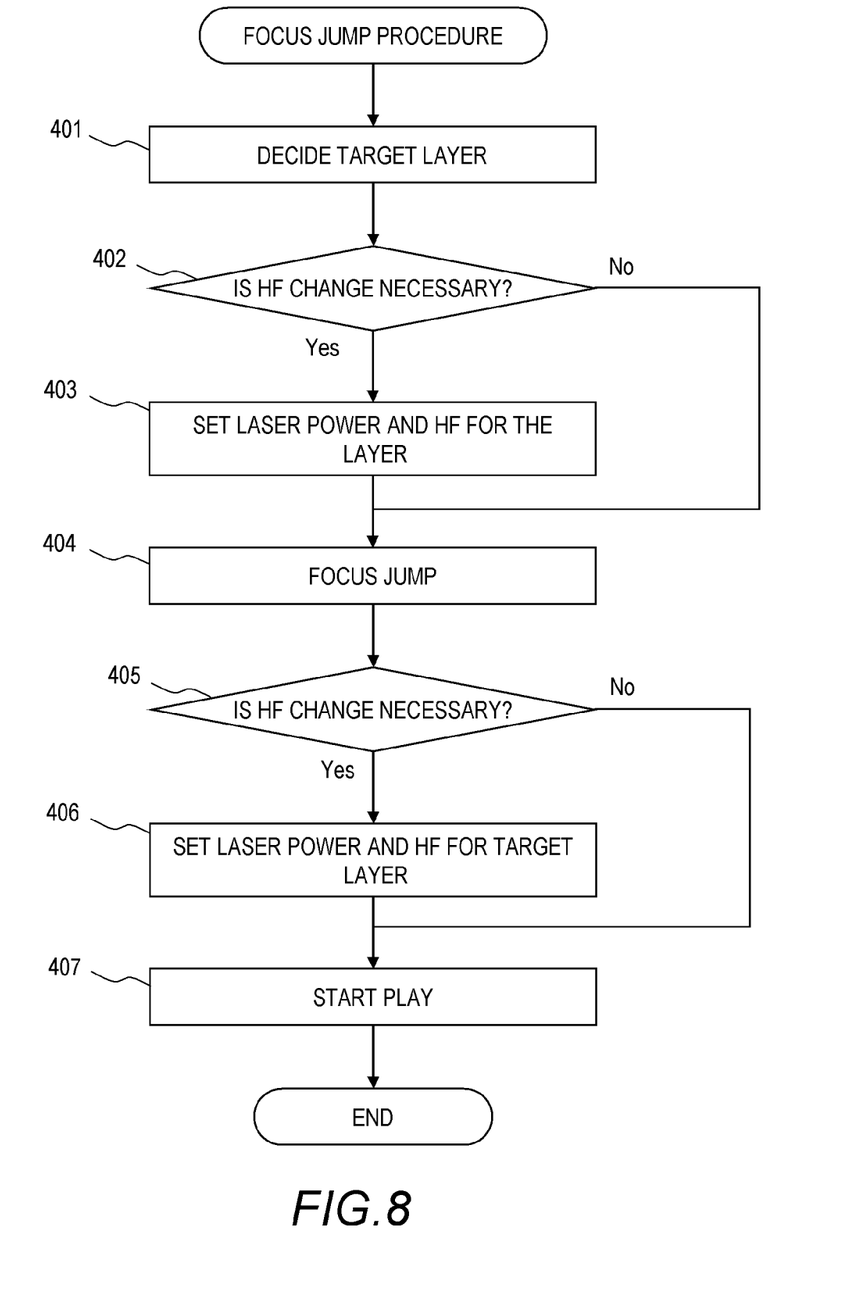
FIG. 8 is a flowchart of a focus jump procedure during play in the optical disc device in the embodiment of the invention.

FIG. 8 is a flowchart of a focus jump procedure during play in the optical disc device 100 in this embodiment of the invention; the procedure is executed by the system controller 114. A focus jump is carried out to shift the focus to a different layer during play of a multilayer optical disc 101.

In step 401, the system controller 114 decides a destination layer (hereinafter, a target layer). The system controller 114 selects the next layer when a layer being played is finished or decides a layer appointed by the host computer as the target layer.

Next, the system controller 114 determines whether the setting on the high frequency signal need to be changed or not when shifting the focus from the layer currently in focus (the current layer) to the target layer (402). As described above, since reflection and dispersion occur more on layers closer to the plane of incidence of laser light (the surface 1010), the laser power P becomes lower as the layer is away from the surface 1010. Assuming that the multilayer optical disc 101 has four layers, a layer L0 to a layer L3, as shown in FIG. 3, the relationship of the light densities D(L0) to D(L3) of the respective layers is:

$$D(L0)<D(L1)<D(L2)<D(L3) \qquad (2')$$

which is similar to the above expression (2). Since the layer-HF table 220 is set so that the peak power with a high frequency signal superimposed will be lower for a layer closer to the surface of the optical disc 101 as shown in FIG. 9, when shifting the focus to a layer closer to the surface 1010, the system controller 114 changes the setting on the high frequency signal to a set of values for the lower peak power on the target layer to prevent the recording plane of the target layer from being damaged. For this reason, the determination by the system controller 114 whether to change the setting on the high frequency signal should be the determination whether the shift from the current layer to the target layer is a shift to a layer closer to the surface 1010. If the shift from the current layer to the target layer is a shift to a layer closer to the surface 1010, the system controller 114 proceeds to step 403. On the contrary, if the shift is the one to a deeper layer, it proceeds to step 404.

In the step 403, the system controller 114 refers to the layer-HF table 220 to change the setting on the high frequency signal into the set of values for lower peak power on the target layer. It also changes the laser power target value 2202 into the value for the target layer.

In the step 404, the system controller 114 sends the servo controller 140 a drive instruction to drive the actuator 141 of the object lens 103 to shift the focus onto the target layer.

Next, in step 405, the system controller 114 determines whether to change the setting on the high frequency signal after shifting the focus on the target layer. Unlike in the above-described step 402, the focus jump is performed from a layer closer to the surface 1010 to a deeper layer with the setting on the high frequency signal for the current layer kept, so the peak power with the high frequency signal superimposed remain low. In other words, to shift the focus from a layer closer to the surface 1010 to a deeper layer, the focus jump is performed with the setting on the high frequency signal for lower peak power to prevent the recording plane of the current layer from being damaged. Therefore, the determination in step 405 whether the setting on the high frequency signal need to be changed is the determination by the system controller 114 whether the shift from the current layer to the target layer is a shift from a layer closer to the surface 1010 to a deeper layer.

If the focus jump is a shift from a layer closer to the surface 1010 to a deeper layer, the system controller 114 proceeds to step 406 and refers to the layer-HF table 220 to change the setting on the high frequency signal into a set of values for the target layer. On the other hand, if the focus jump is a shift to a layer closer to the surface 1010, the system controller 114 keeps the setting on the high frequency signal set in the step 403.

When the focus jump and the changing of the setting on the high frequency signal has been finished, the system controller 114 starts playing the target layer in step 407.

Through the above-described operations, in a focus jump while playing a multilayer optical disc 101, a quick focus jump with no damage to the recording planes between the current layer and the target layer is achieved by changing the setting on the high frequency signal depending on the direction of the shift of focus. In particular, when shifting the focus from a deeper layer to a layer closer to the surface 1010, the system controller 114 carries out the focus jump after changing the setting on the high frequency signal to the setting for lower peak power with the high frequency signal superimposed, so that the recording planes of the layers closer to the surface 1010, where the light densities D are higher, are prevented from being damaged. On the other hand, when shifting the focus from a layer closer to the surface 1010 to a deeper layer, the system controller 114 carries out the focus jump while keeping the lower peak power with the high frequency signal superimposed, and then changes the setting on the high frequency signal to the one for higher peak power on a deeper layer, so that the recording planes of the layers closer to the surface 1010, where the light densities D are higher, are prevented from being damaged. Throughout the above-described operations, the laser light source 108 does not need to be turned on or off during the focus jump, but only the setting on the high frequency signal is changed. Accordingly, a swift focus jump can be achieved.

The setting on the high frequency signal can be changed on the basis of the magnitude relation in the light density between the current layer and the target layer. To that end, the magnitude of the light density of each layer may be determined by referring to the setting on the high frequency signal and the laser power in the layer-HF table 220, which has preliminarily prepared in accordance with the light density of each layer.

Figure 10:
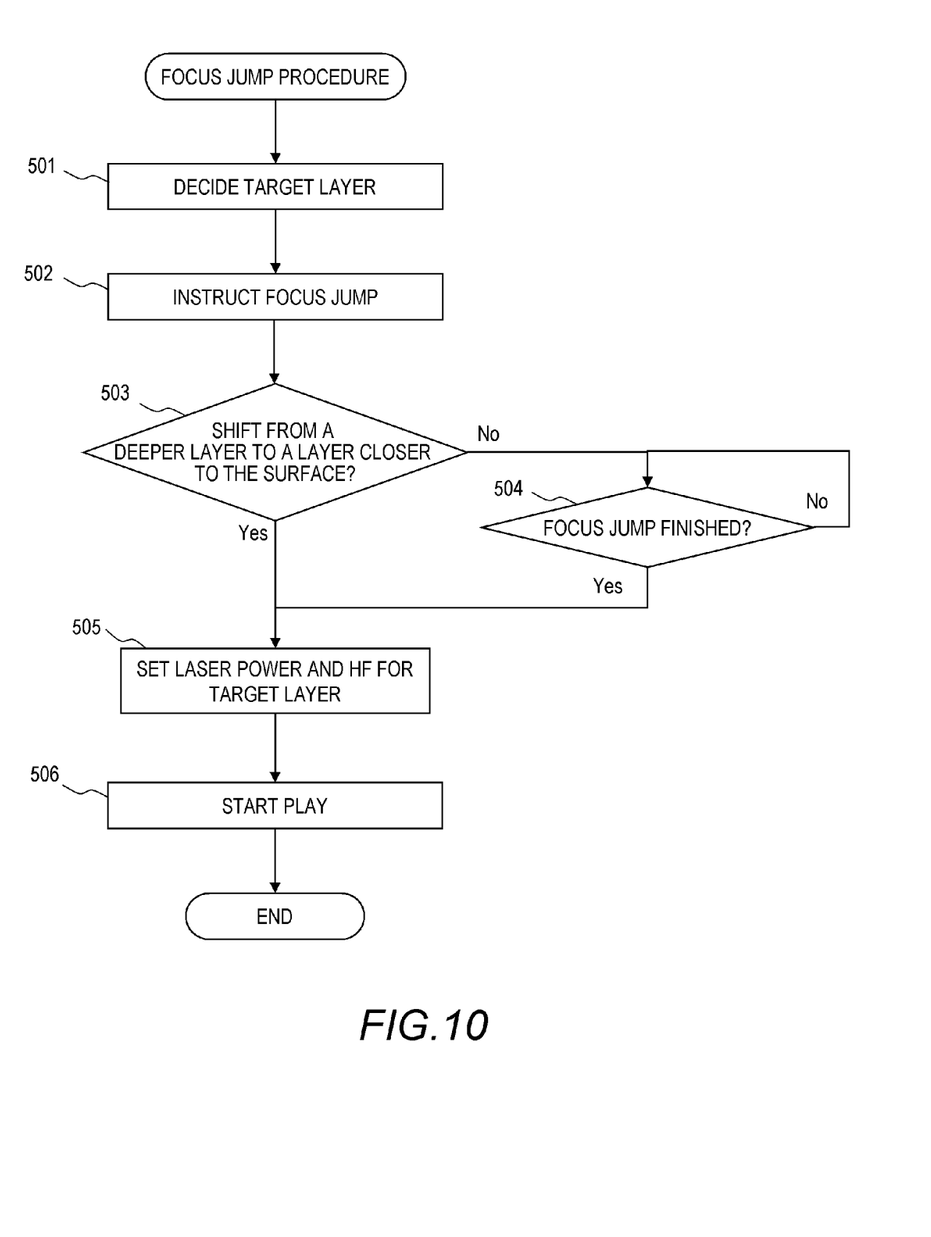
FIG. 10 is a flowchart of a modified example of a focus jump procedure during play by an optical disc device in the embodiment of the invention.

FIG. 10 is a flowchart of a modified example of a focus jump procedure during play by an optical disc device 100 in this embodiment of the invention; the procedure is executed by the system controller 114. This focus jump procedure is a modification of the procedure of FIG. 8 in which the setting on the high frequency signal is changed during a focus jump.

In step 501, the system controller 114 decides the target layer of the destination like the step 401 of FIG. 8. Next, it sends an instruction to shift the focus from the current layer currently in focus to the target layer to the servo controller 140 (502).

In step 503, the system controller 114 determines whether the direction of the shift of the focus is from a deeper layer to a layer closer to the surface 1010.

If the focus jump is from a deeper layer to a layer closer to the surface 1010, the system controller 114 proceeds to step 505 and changes the setting on the high frequency signal to the values for the target layer.

On the other hand, if the focus jump is from a layer closer to the surface 1010 to a deeper layer, the system controller 114 proceeds to step 504 and wait for the end of the focus jump while keeping the setting on the high frequency signal for the current layer. When the system controller 114 detects the shift of focus to the target layer with reference to a focus error signal or a sum signal, it proceeds to step 505 to change the setting on the high frequency signal to the setting for the target layer. Then, it starts playing the target layer (506).

Through the above procedure, like the procedure shown in FIG. 8, in a focus jump on a multilayer optical disc 101 being played, the system controller 114 changes the setting on the high frequency signal depending on the direction of the change of layers to achieve a quick focus jump with no damage to the recording planes between the current layer and the target layer. To shift the focus from a deeper layer to a layer closer to the surface 1010, the system controller 114 changes the setting on the high frequency signal to the setting for the target layer on which the peak power is lower with the high frequency signal superimposed after instructing the actuator 141 to drive the optical pickup 120. Consequently, in layers closer to the surface 1010 with higher light densities D, the recording planes are prevented from being damaged.

On the contrary, to shift the focus from a layer closer to the surface 1010 to a deeper layer, the system controller 114 carries out a focus jump while keeping lower peak power with the high frequency signal superimposed, and then changes the setting on the high frequency signal to the setting for a deeper layer on which the peak power is higher. Consequently, in layers closer to the surface 1010 with higher light densities D, the recording planes are prevented from being damaged. Throughout the above-described operations, the laser light source 108 does not need to be turned on or off during the focus jump, but only the setting on the high frequency signal are changed. Accordingly, a quick focus jump can be achieved.

While the present invention has been described in detail and pictorially in the accompanying drawings, the present invention is not limited to such detail but covers various obvious modifications and equivalent arrangements, which fall within the purview of the appended claims.

What is claimed is:

1. An optical disc device comprising:
   a laser light source driven by a drive signal with a high frequency signal superimposed;
   a detector for detecting reflection of laser light emitted from the laser light source; and
   a controller for reading data from an optical disc having a plurality of recording layers with a signal outputted from the detector, wherein:
   the controller, in shifting a focus of the laser light from a first recording layer to a second recording layer among the plurality of recording layers, performs a first change that changes a setting on the high frequency signal to a predetermined value at which the high frequency signal is superimposed to suppress the peak power of the drive signal if a light density of the second recording layer is higher than a light density of the first recording layer;
   the controller shifts the focus from the first recording layer to the second recording layer; and
   the controller, after the focus has been shifted, performs a second change that changes the setting on the high frequency signal to a predetermined value at which the high frequency signal is superimposed to increase the peak power of the drive signal if the light density of the second layer is lower than the light density of the first recording layer.

2. The optical disc device according to claim 1, wherein the controller, after starting the shift of the focus from the first recording layer to the second recording layer, performs the first change and the second change.

3. The optical disc device according to claim 1, wherein:
   the controller has information in which the setting on the high frequency signal is predetermined in accordance with the light density of each of the recording layers of the optical disc; and
   the information predetermines the setting on the high frequency signal for each of the recording layers so that the peak power of the drive signal with the high frequency signal superimposed is lower for a recording layer closer to a surface of the optical disc facing the laser light source.

4. The optical disc device according to claim 1, wherein:
   the controller has information in which laser power of the laser light is predetermined in accordance with the light density of each of the recording layers of the optical disc; and
   the information predetermines the laser power for each of the recording layers so that the laser power is lower for a recording layer closer to a surface of the optical disc facing the laser light source.

5. The optical disc according to claim 1, wherein:
   the controller, in focusing on any one of the plurality of recording layers, starts irradiation of the laser light using a setting on the high frequency signal set for the recording layer with the highest light density of the plurality of recording layers as an initial setting; and
   the controller, after retrieving management information from the optical disc, obtains a setting for the recording layer to be focused on from the setting of the high frequency signal predetermined for each of the recording layers, and changes the setting of the high frequency signal to be superimposed on the drive signal for the laser light source.

6. An optical disc device comprising:
   a laser light source driven by a drive signal with a high frequency signal superimposed;
   a detector for detecting reflection of laser light emitted from the laser light source; and
   a controller for reading data from an optical disc having a plurality of recording layers with a signal outputted from the detector, wherein:
   the controller, in focusing on any one of the plurality of recording layers, starts irradiation of the laser light using a setting on the high frequency signal set for the recording layer with the highest light density of the plurality of recording layers as an initial setting; and
   the controller, after retrieving management information from the optical disc, obtains a setting for the recording layer to be focused on from the setting of the high frequency signal predetermined for each of the recording layers, and changes the setting of the high frequency signal to be superimposed on the drive signal for the laser light source, wherein:
   the controller, in shifting a focus of the laser light from a first recording layer to a second recording layer among the plurality of recording layers, performs a first change that changes a setting on the high frequency signal to a predetermined value at which the high frequency signal is superimposed to suppress peak power of the drive signal if a light density of the second recording layer is higher than a light density of the first recording layer;
   the controller shifts the focus from the first recording layer to the second recording layer; and
   the controller, after the focus has been shifted, performs a second change that changes the setting on the high frequency signal to a predetermined value at which the high frequency signal is superimposed to increase the peak power of the drive signal if the light density of the second recording layer is lower than the light density of the first recording layer.

7. A control method of an optical disc device comprising a laser light source driven by a drive signal with a high frequency signal superimposed, a detector for detecting reflection of laser light emitted from the laser light source, and a controller for reading data from an optical disc having a plurality of recording layers with a signal outputted from the detector, the method comprising the steps of:

performing, by the controller in shifting a focus of the laser light from a first recording layer to a second recording layer among the plurality of recording layers, a first change that changes a setting on the high frequency signal to a predetermined value at which the high frequency signal is superimposed to suppress peak power of the drive signal if a light density of the second recording layer is higher than a light density of the first recording layer;

shifting, by the controller, the focus from the first recording layer to the second recording layer; and performing, by the controller, after the focus has been shifted, a second change that changes the setting on the high frequency signal to a predetermined value at which the high frequency signal is superimposed to increase the peak power of the drive signal if the light density of the second recording layer is lower than the light density of the first recording layer.

* * * * *